US006876123B2

(12) United States Patent
Martinovsky et al.

(10) Patent No.: US 6,876,123 B2
(45) Date of Patent: Apr. 5, 2005

(54) THERMOTUNNEL CONVERTER WITH SPACERS BETWEEN THE ELECTRODES

(75) Inventors: Artemy Martinovsky, St. Petersburg (RU); Avto Tavkhelidze, Tbilisi (GE); Isaiah Watas Cox, London (GB)

(73) Assignee: Borealis Technical Limited (GI)

( * ) Notice: Subject to any disclaimer, the term of this patent is extended or adjusted under 35 U.S.C. 154(b) by 103 days.

(21) Appl. No.: 10/232,436

(22) Filed: Aug. 28, 2002

(65) Prior Publication Data

US 2003/0042819 A1 Mar. 6, 2003

Related U.S. Application Data

(60) Provisional application No. 60/315,537, filed on Aug. 28, 2001.

(51) Int. Cl.[7] .................................................. H02N 3/00

(52) U.S. Cl. ....................................... 310/306; 136/205

(58) Field of Search ................................ 310/306, 307; 136/200, 201, 202, 205; 313/310; 376/321

(56) References Cited

U.S. PATENT DOCUMENTS

| | | | | | |
|---|---|---|---|---|---|
| 2,510,397 A | * | 6/1950 | Hansell | ...................... | 374/174 |
| 3,169,200 A | * | 2/1965 | Huffman | ..................... | 310/306 |
| 3,173,032 A | * | 3/1965 | Maynard | .................... | 310/306 |
| 3,821,462 A | * | 6/1974 | Kaufman et al. | ......... | 174/15 C |
| 4,188,571 A | * | 2/1980 | Brunson | ..................... | 322/2 R |
| 4,373,142 A | * | 2/1983 | Morris | ....................... | 310/306 |
| 4,667,126 A | * | 5/1987 | Fitzpatrick | .................. | 310/307 |
| 5,994,638 A | * | 11/1999 | Edelson | ...................... | 136/205 |
| 6,064,137 A | * | 5/2000 | Cox | ........................... | 310/306 |
| 6,489,704 B1 | * | 12/2002 | Kucherov et al. | .......... | 310/306 |
| 2003/0042819 A1 | * | 3/2003 | Martinovsky | ............... | 310/306 |

FOREIGN PATENT DOCUMENTS

| | | | | |
|---|---|---|---|---|
| WO | 99/10974 | * | 3/1999 | .......... H02N/10/00 |
| WO | 99/13562 | * | 3/1999 | ............ H02N/2/00 |
| WO | WO03/021758 | * | 3/2003 | |

OTHER PUBLICATIONS

Huffman, F.N. & Haq, Z. "Preliminary Investigations of a Thermotunnel Converter", (1988) 23rd Intersociety Energy Conversion Engineering Conference vol. 1, pp. 573–579.

* cited by examiner

*Primary Examiner*—Karl Tamai

(57) ABSTRACT

A thermotunneling converter is disclosed comprising a pair of electrodes having inner surfaces substantially facing one another, and a spacer or plurality of spacers positioned between the two electrodes, having a height substantially equal to the distance between the electrodes, and having a total cross-sectional area that is less than the cross-sectional area of either of the electrodes. In a preferred embodiment, a vacuum is introduced, and in a particularly preferred embodiment, gold that has been exposed to cesium vapor is used as one or both of the electrodes. In a further embodiment, the spacer is made of small particles disposed between the electrodes. In a yet further embodiment, a sandwich is made containing the electrodes with an unoxidized spacer. The sandwich is separated and the spacer is oxidized, which makes it grow to a required height whilst giving it insulatory properties, to allow for tunneling between the electrodes.

52 Claims, 7 Drawing Sheets

Figure 1A:
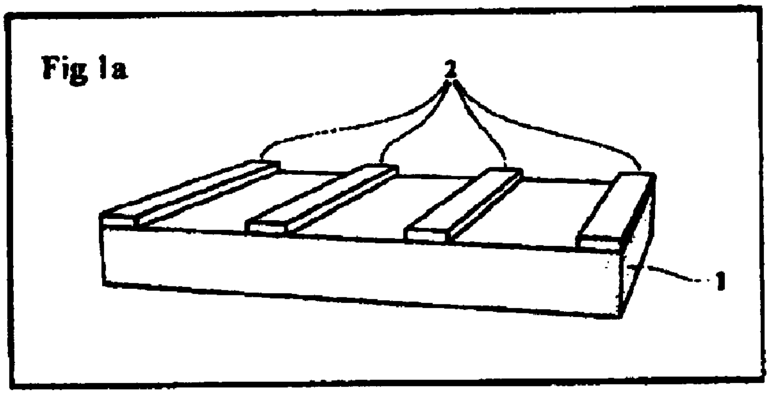
Figure 1B:
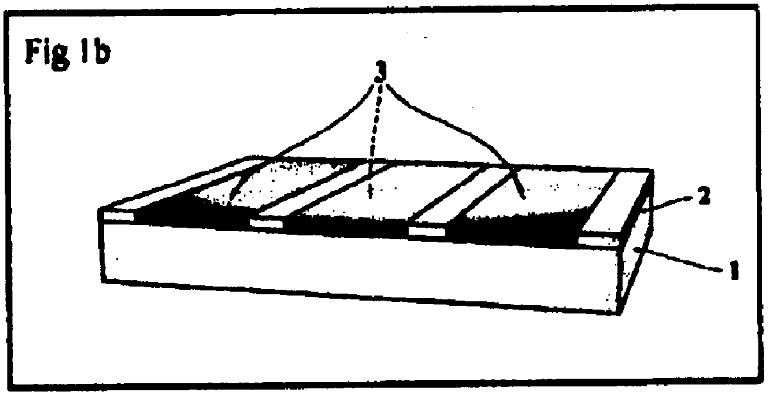

4
5
1

4
5
1

THERMOTUNNEL CONVERTER WITH SPACERS BETWEEN THE ELECTRODES

CROSS-REFERENCE TO RELATED APPLICATIONS

This application claims the benefit of U.S. Provisional Application No. 60/315,537, Aug. 28, 2001.

BACKGROUND OF THE INVENTION

The present invention relates to means for interconverting thermal energy and electric power, and more especially to thermotunneling devices for cooling and power generation.

In U.S. Pat. No. 3,169,200 to Huffman, a multilayer converter is described which comprises two electrode, intermediate elements and oxide spacers disposed between each adjacent element. A thermal gradient is maintained across the device and opposite faces on each of the elements serve as emitter and collector. Electrons tunnel through each oxide barrier to a cooler collector, thereby generating a current flow through a load connected to the two electrodes.

One drawback is that the device must contain some $10^6$ elements in order to provide reasonable efficiency, and this is difficult to manufacture.

A further drawback results from the losses due to thermal conduction: although the oxide spacers have a small contact coefficient with the emitter and collector elements, which minimizes thermal conduction, the number of elements required for the operation of the device means that thermal conduction is not insignificant.

There remains a need in the art therefore for a device having fewer elements, which is easier to fabricate, and in which losses due to thermal conduction are further reduced.

SUMMARY OF THE INVENTION

In broad terms, the present invention is a thermotunneling device, having a plurality of electrodes, each separated by a respective strip or other shaped spacer or plurality of spacers, allowing for a vacuum or inert gas to exist between the gaps in spacer material. In preferred embodiments, the spacer materials are either thermal or electrical insulators, or are both.

The invention also provides a method for fabricating such a thermotunneling device in which various layers are built with insulating spacers between them, arranged as long strips running across each layer, which subsequent layers are balanced upon. In one embodiment, a sacrificial layer may be introduced in between and around the spacers, and the subsequent conductive layer is deposited on both the spacer element and the sacrificial layer. In another embodiment, the invention provides the various layers to be thin sheets of metal. In this embodiment, the spacers may be formed of bucky balls, nanotubes (for example, of carbon or boron) or nanowires arranged between each sheet of metal and the adjacent one, to keep the sheets apart. In a yet further embodiment, the spacers comprise $Al_2O_3$, and are arranged as one or many columns between each pair of layers. Other embodiments are described below.

In a preferred embodiment, the device has approximately 100 layers. In a further preferred embodiment, the device has approximately 10 layers. In a further preferred embodiment, the device has a single layer.

A technical advantage of the present invention is that only a hundred or so layers may be used to achieve the thermotunneling effect with sufficient efficiency for commercial applications. This is more easily achievable than the prior art $10^6$ layers. In some embodiments, this number is reduced to about 10 layers, and even to just two electrodes.

Another technical advantage of the present invention is that adjacent electrodes may be spaced more than 40 angstroms apart, without requiring entire oxide films in between adjacent electrodes.

Another technical advantage of the present invention is that it may be constructed using micromachining or other methods.

An additional technical advantage of the present invention is that the basic design can be modularly increased or decreased in accordance with the intended usage of the device, by adding more, or reducing the number of layers.

An additional technical advantage of the present invention is that it results in high electrical output, over a range of temperature differentials, when the device is used as a generator.

A yet additional technical advantage of the present invention is that it allows thermotunneling devices to be made more cheaply, quickly, and easily.

Further objects and advantages of this invention will become apparent from a consideration of the figures and the ensuing descriptions.

BRIEF DESCRIPTION OF SEVERAL VIEWS OF THE INVENTION

For a more complete explanation of the present invention and the technical advantages thereof, reference is now made to the following description and the accompanying drawings, in which:

FIGS. 1*a–f* illustrates how spacers may be deposited, the gap or gaps between them filled in, and subsequent electrodes deposited above the spacers;

FIGS. 2*a–e* illustrates how a removable layer may be laid upon an electrode, leaving gaps of appropriate sizing for the spacers, which are then added, a subsequent electrode laid above them, and the removable material removed;

FIGS. 3*a–d* illustrates how nanotubes may be arranged upon an electrode, and a subsequent electrode laid upon the carbon nanotubes;

FIGS. 4*a–d* illustrates how a potential spacer is deposited upon an electrode, and a second electrode laid upon that. The second electrode is distanced, and the potential spacer is grown to have the correct site and insulating properties.

DETAILED DESCRIPTION OF THE INVENTION

The present invention is directed to a thermotunneling converter. Provided are two electrodes, separated from one another by a vacuum, and portions of spacer material. In one embodiment there consist a multiple of intermediate elements, acting as subsequent emitters and collectors, between the electrodes. Between each pair of layers there is a percentage of spacer material, and the remaining space is evacuated to less than a few Torr, or filled with an inert gas at a similar pressure, resulting in low thermal conductivity. Embodiments of the present invention include using columns, honeycombs, or strips etc of insulating material in between each pair of layers as the spacers, to keep the layers apart whilst leaving room for a vacuum or gas backfill (at a few Torr) in between the conductive layers. Using spacers in this way reduces the thermal conductivity of the device more than using a layer of insulating material across the whole of the gap, as described by Huffman. Due to this minimization of insulating material between conductive layers, the number of conductive layers may be in the region of 100 layers (as opposed to 1,000,000 as has been previously suggested by Huffman), or even just ten or even fewer. Furthermore, it may be possible to build a thermotunneling device having only two electrodes, spaced further apart than the 40 angstroms delineated by Huffman.

Figure 1C:
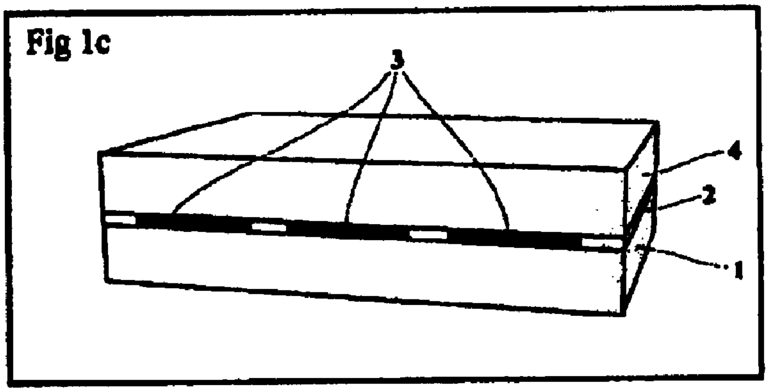
Figure 1D:
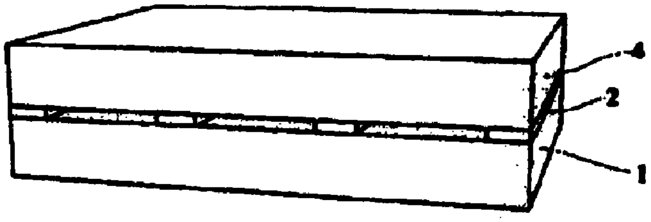
Figure 1E:
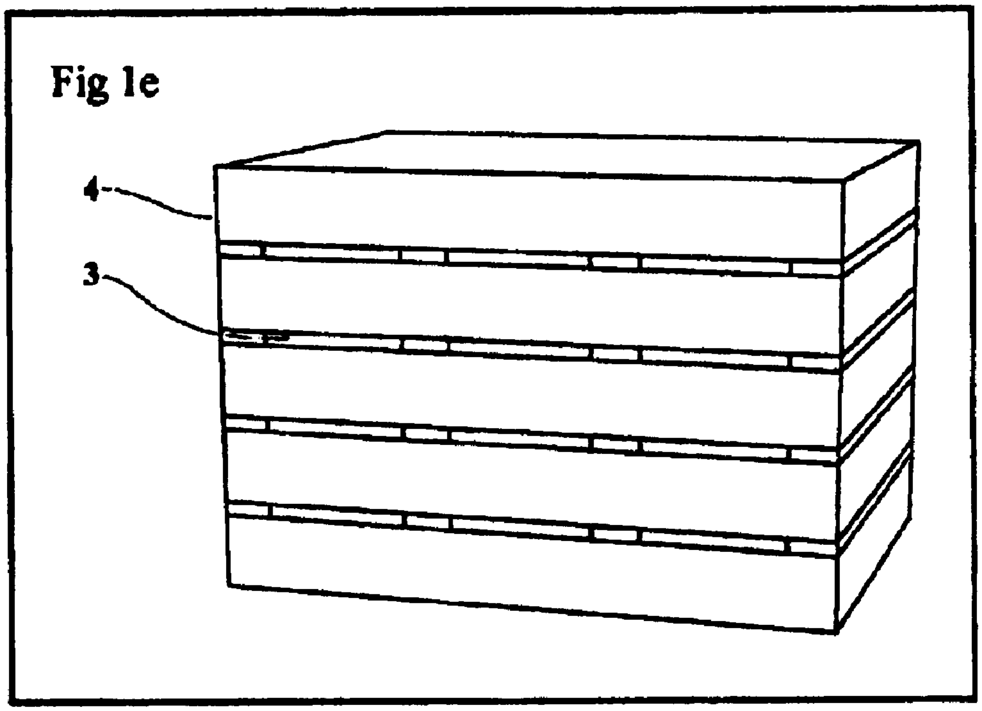
Figure 1F:
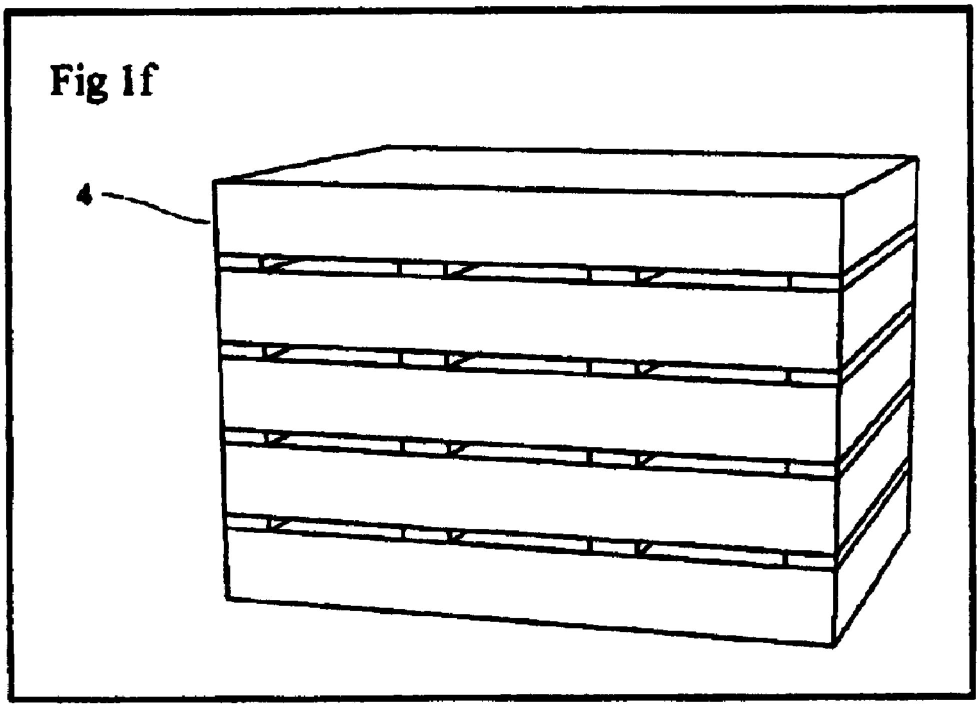

In one embodiment, an electrode surface is prepared, and arranged upon it are a plurality of spacers. These may be deposited, applied through a mask and grown, gently laid down, or otherwise placed upon the electrode surface. The spaces between the spacers are then filled with a removable material, up to the height of the spacers. In one preferred embodiment, there is only one spacer, In the form of a large "X" stretching across the electrode surface. This allows for easier subsequent removal of the removable material. A second electrode is then laid down or deposited as a liquid and hardened, or otherwise placed upon the spacers and removable material. These steps are repeated with more layers of spacers and removable material, and subsequent electrodes, until the device has a required number of layers. The removable material a then dissolved, evaporated or otherwise removed. The removable material may be completely removed from the device, or allowed to remain at the base of a housing to the device where it will not interfere with the workings of the device. In one embodiment, a hole is drilled through the center of the device, through all the layers, and the removable material is removed through that. In a different embodiment, each layer of removable material is removed straight after the electrode above it has been placed in position. This approach may be better understood by reference to FIGS. 1*a–f* and Example 1. FIG. 1*a* illustrates how spacer material 2 may be laid upon a first electrode 1, In FIG. 1*b*, the gaps between the strips of spacer material 2 are subsequently filled with removable material 3. FIG. 1*c* shows how a second electrode 4 is deposited above the layer comprising spacer material 2 and removable material 3. If the filling of the removable material 3 in the gaps between the spacer material 2 is done to a constant depth, then this deposition of the second electrode 4 allows the second electrode 4 to have substantially mirroring surface characteristics to the first electrode 1. FIG. 1*d* depicts the finished converter with the removable material finally removed, and only a space, or preferably a vacuum or inert gas filling remaining in the spaces between the two facing electrodes iii the gaps between the spacer material. FIG. 1*e* shows how a multilayered converter may be built, with each of the second and subsequent electrodes 4 substantially mirroring the surface configuration of the opposite surfaces. Thus the electrodes have related topologies, such that indentation on the inner face of either electrode face protrusions in the facing surface of the other electrode, and where one has indentations the other substantially has protrusions. FIG. 1*f* shows that removable material 3 in between all the electrode layers is removable at once, at the end. The insulating spacers must be mechanically durable enough against atmospheric pressure and Coulomb attractive forces, and are comprised of a material such as silicon or $Al_2O_3$. Alternatively, the device may be encapsulated in very tough material which allows the insulating strips to have less mechanical durability, or a smaller cross-section. This approach is given in Example 1 below.

Figure 2A:
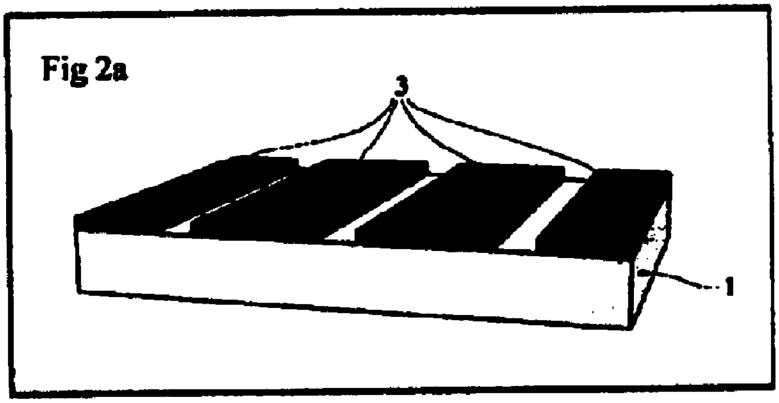
Figure 2B:
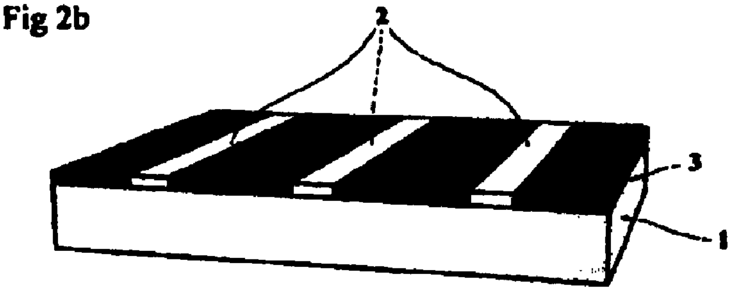
Figure 2C:
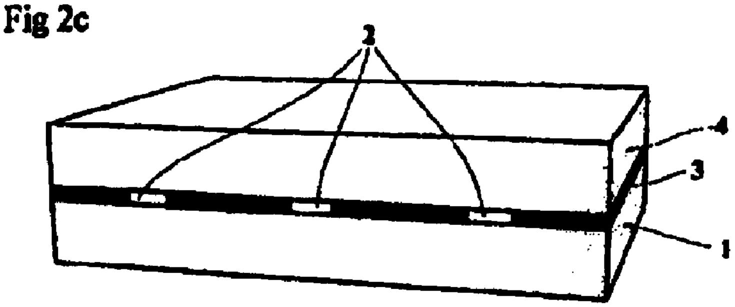
Figure 2D:
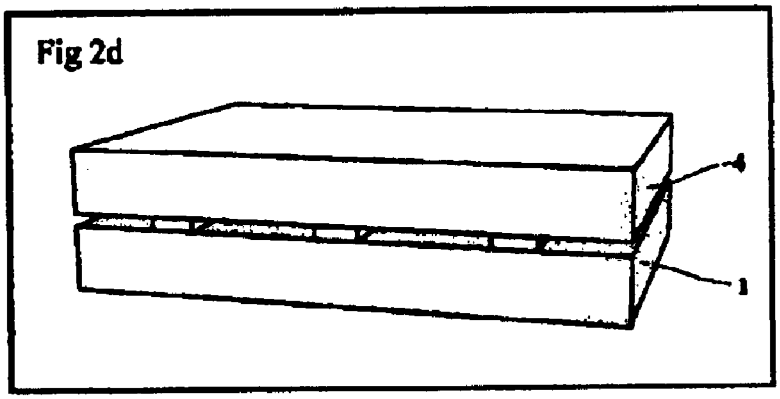
Figure 2E:
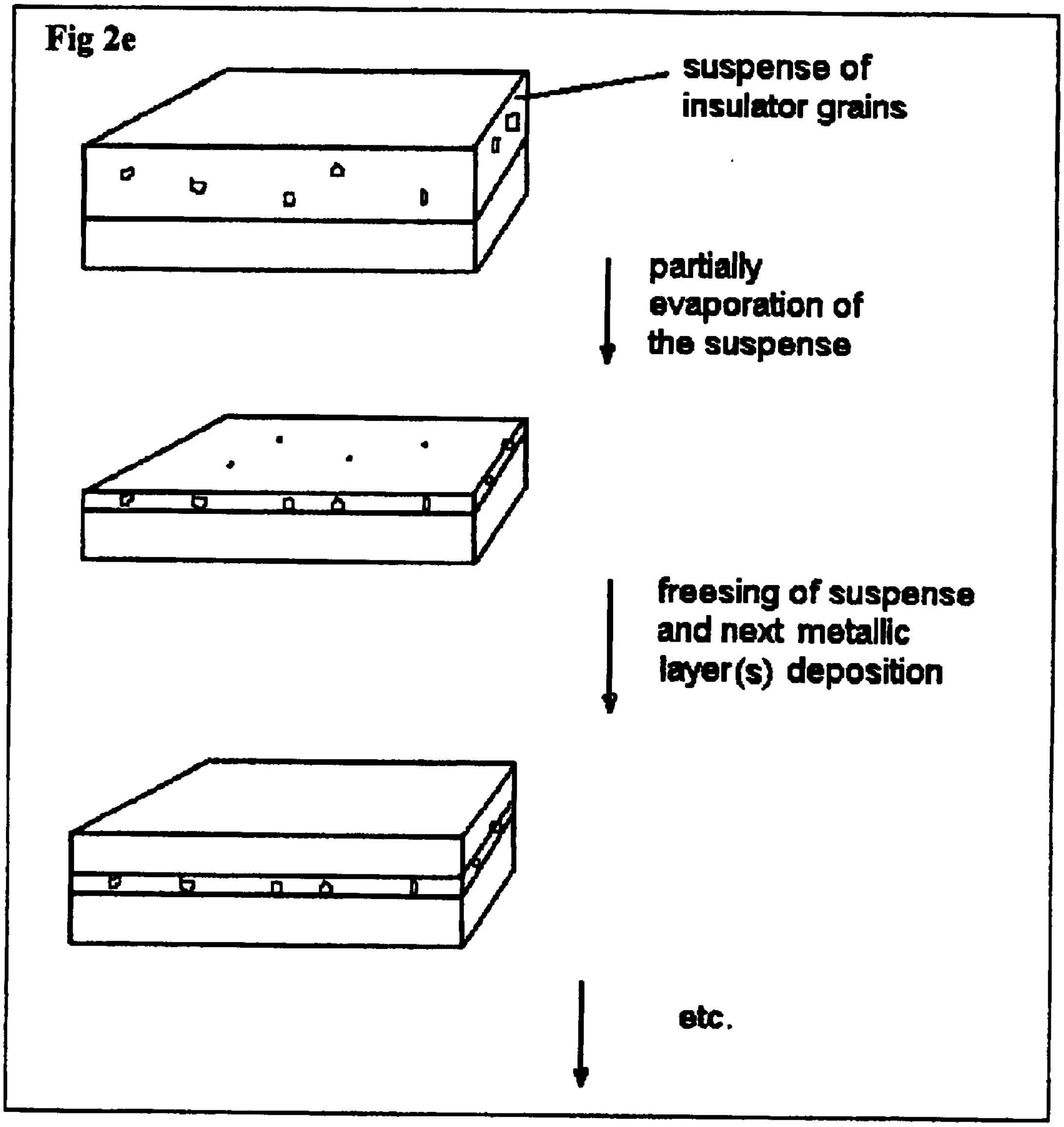

In a second embodiment, a multitude of layers may be built very easily whilst maintaining the positions of subsequent electrodes relative to one another. The present embodiment has the further advantage of using the removable material to shape the spacer, allowing for greater precision in spacer shape, and allowing for adding the spacer as an insulator powder dissolved into a liquid, and other advantages. This approach may be better understood by reference to FIG. 2. A first electrode is prepared, and a mask is place above it. In FIG. 2*a*, a soluble or otherwise removable material 3 is applied through the mask to fill the areas except for the regions that are to be filled with spacer material. The removable material 3, may be applied to a regulated depth, and therefore have an upper surface that is substantially identical to its lower surface. In FIG. 2*b*, the spacer material 2 is then deposited, or grown in situ into the spaces between the soluble material. In FIG. 2*c*, a second electrode 4 is deposited above the filled removable material 3. In this way, the lower surface of the second electrode 4 will substantially mirror the upper surface of the first electrode 1. Furthermore, built in this way, the device may be tough enough for subsequent depositions of removable materials 3 and spacers 2 and electrodes 4, enabling the creation of multilayered devices. FIG. 2*d* illustrates how the removable material 3 may be subsequently removed to leave a vacuum or gas filled region between the electrodes 1 and 4. The removable layer of this embodiment may be grown instead of deposited through a mask, or may be selectively deposited in another way. The device could comprise only two electrodes, or a greater plurality. If more electrodes are required, the above steps are repeated the required number of times. The next step is the removal of the layer or layers of removable materials by the application of appropriate chemicals, or by other means appropriate to the actual embodiment. This leaves the electrodes separated from one another by islands of substantially thermally and electrically insulating spacer material. In another embodiment the removable layer may be removed before the addition of the second electrode, in which case the second electrode would probably comprise a thin film gently laid upon the spacer material. In another embodiment, the removable layer is removed after an electrode has been placed into position above the removable layer, and before the next layer of removable material is applied. It has been described that the insulator spacer material be added or grown up to the height of the soluble material. It is also possible for the insulator material to exceed the height of the soluble material, whereupon an electrode deposited above the soluble material could be somewhat thinner over the insulator material than in other areas. In some cases, this may give the device greater stability, by keeping the spacer locked in position with the upper electrode. In another variation, a suspension of an ultra-powdered insulator, such as silicon oxide, or $Al_2O_3$, or other material that is substantially thermally and electrically insulating, is deposited across the surface of the bottom electrode. Part of liquid is then evaporated, and the remaining part with grains is frozen, and the next metal layer is deposited. After the desired number of layers has been constructed, the suspending liquid is removed by sublimation or evaporation, and the uniformly distributed powder grains separate the metal layers. This is shown in FIG. 2*e*. In the present embodiment, the spacer solution is added to fill the hole or holes in the soluble material, after which, the liquid part of the spacer solution is evaporated.

Figures 3A, 3B, 3C:
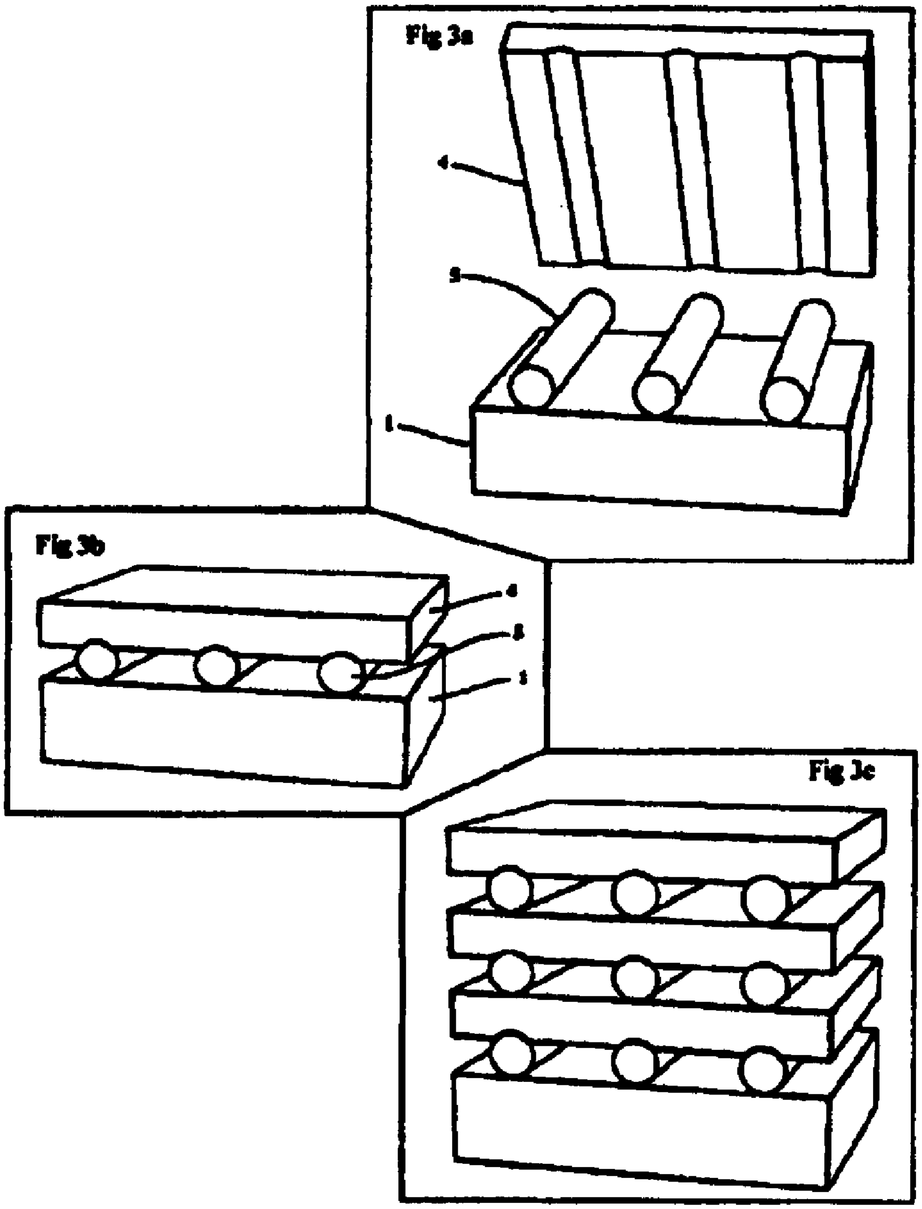
Figure 3D:
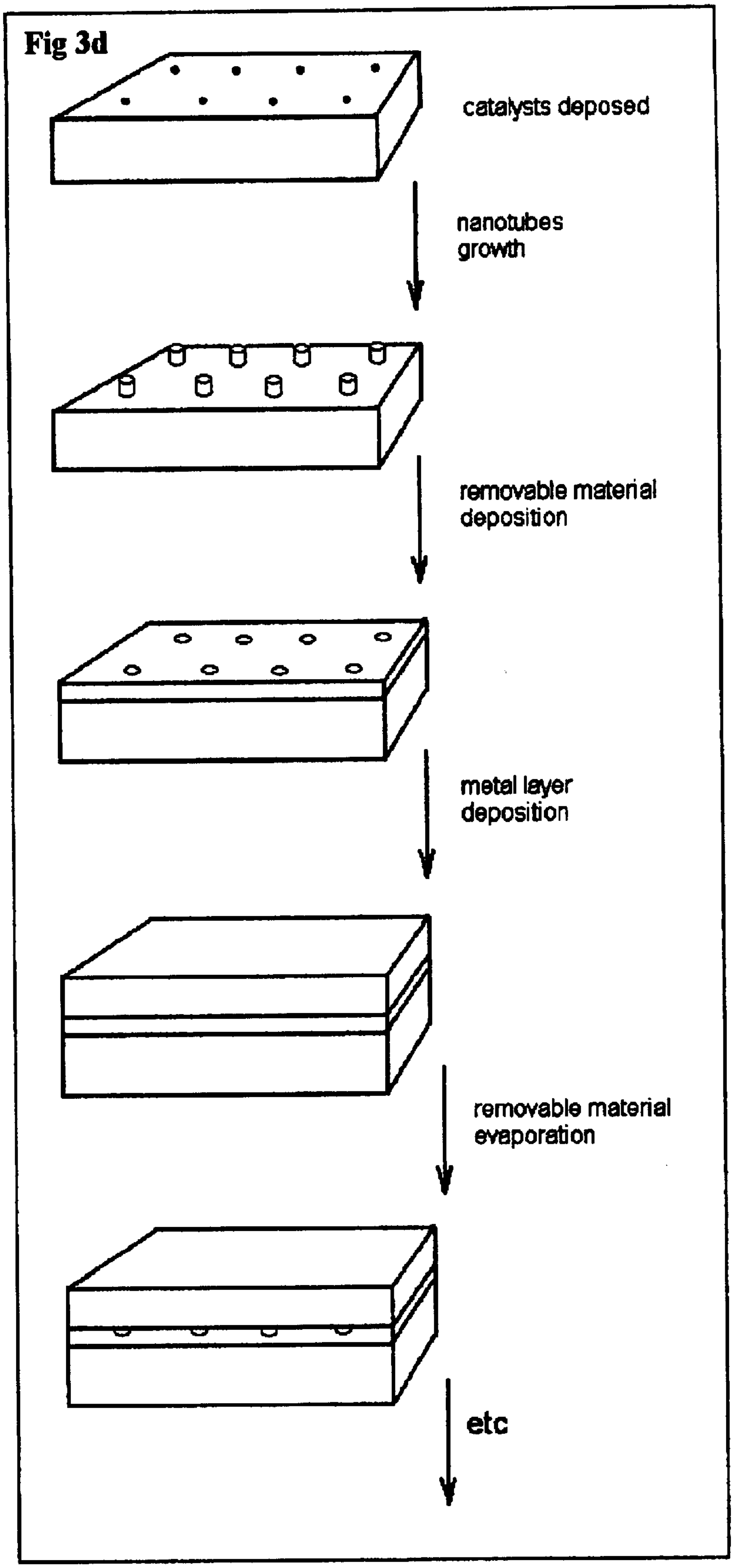

In a third embodiment a multiple of layers, disposed one above the other, and held apart by a sprinkling or arrangement of nanotubes (e.g. carbon or boron), nanowires or bucky balls placed upon each layer is fabricated. Other similar-sized objects could alternatively be used in this manner, preferably with relatively low thermal and electrical conductivity and high mechanical endurance, to provide separation between respective layers. Electromechanical or similar means may be employed to position the nanotubes or bucky balls etc. Methods for positioning carbon nanotubes and spheres are flown in the art, and could be applied to the present invention. In practice, any material of a consistent nano-scale size could be used. Included in variations of this embodiment is also a device made of insulating spacers deposited in pillars on an electrode surface. The next electrode, already prepared, is then laid upon the insulating spacers. One method of making the present embodiment is shown in FIG. 3. FIG. 3*a* in this example is shown to have lower electrode 1 prepared, and a plurality of carbon nanotubes 5 arranged thereupon. These form the spacer material. A second electrode 4 is shown ready for deposition upon the carbon nanotubes. Although not an implicit part of the invention, FIG. 3*a* shows how the second electrode 4 is preformed with grooves to hold the carbon nanotubes in position. In an alternative method of preparation, the electrode could be laid with appropriate pressure upon the carbon nanotubes, and be sufficiently pliable, to mold itself partially around the upper surfaces of the carbon nanotubes, and thereby maintain their positions between the electrodes. These examples are provided for illustrative purposes only and should not be seen as limiting the scope of the invention in any way. FIG. 3*b* depicts a two-layered converter comprising first electrode 1, and second electrode 4, carbon nanotubes 5 positioned there between and spaces for a vacuum or gas backfill provided. FIG. 3*c* shows a multilayered version of the same device. In addition, methods for growing nanotubes vertically are known now in the art; short (2–5 nm) nanotubes may be grown on the first electrode surface, and a removable substance may be deposited around the nanotubes and frozen. The next metal layer is then deposited, and the removable substance is removed. This process is shown in FIG. 3*d.*

Figure 4A:
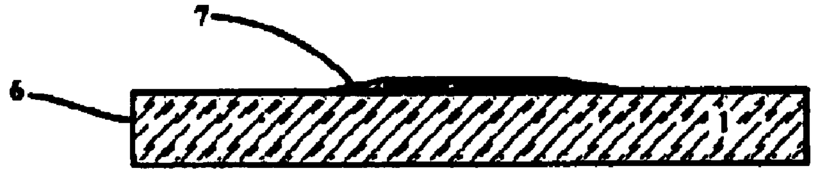
Figure 4B:
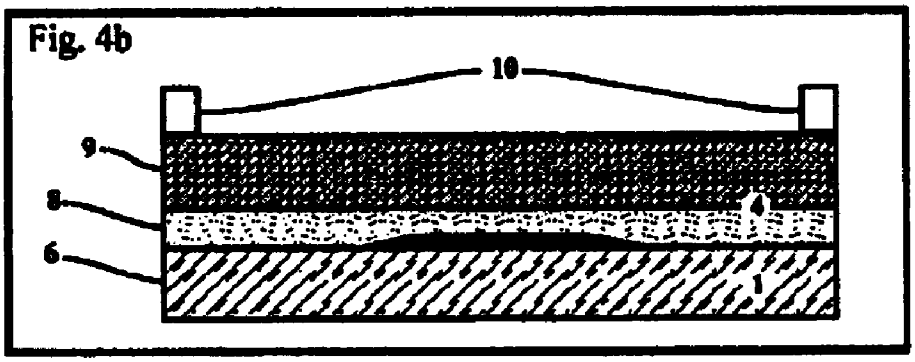
Figure 4C:
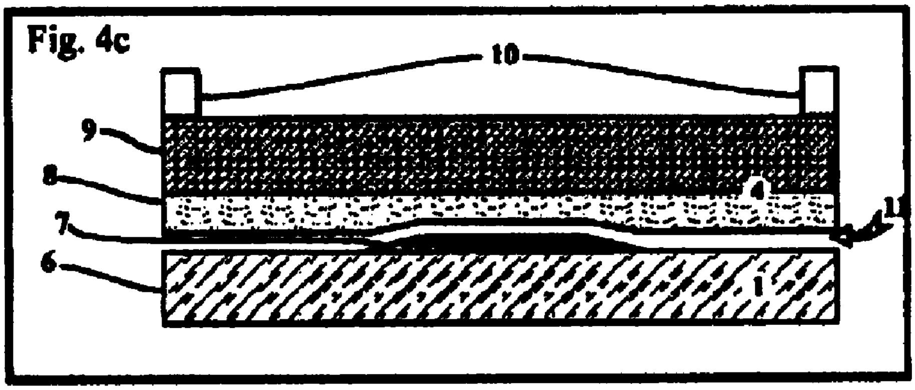
Figure 4D:
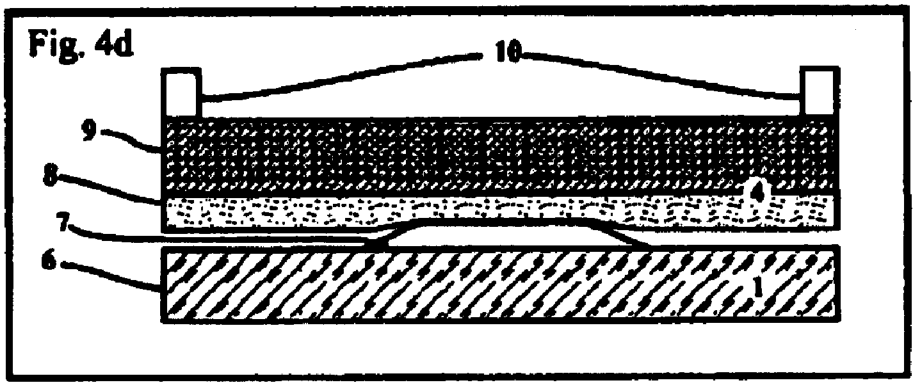

In a fourth embodiment, the electrodes may be spaced apart very precisely. The process is shown in FIG. 4. Explicit methods and materials are given for illustrative purposes, and to provide one best mode embodiment, however, variations on the theme should certainly be considered as within the scope of the present invention. In FIG. 4*a*, a silicon substrate 6 is prepared as the first electrode 1. A mask with at least one hole in, for example in its center, or with many holes around the periphery, is positioned above the silicon substrate 6, and aluminum 7 is deposited through the hole or holes, to form a very low column. In FIG. 4*b*, silver 8 is deposited over the silicon substrate 6, and copper 9 is grown upon it, together forming a subsequent electrode 4. This forms a sandwich, which is opened, under suitable conditions, i.e. copper plate is separated from silver layer. Positioning means 10 may optionally be added to the device, for separating and subsequent positioning of electrodes. FIG. 4*c* shows the separated sandwich, and pure oxygen 11 is then let in to the opened sandwich. The aluminum column 7 will oxidize to form mainly $Al_2O_3$. The volume of $Al_2O_3$ is approximately 2.5 times more than of two aluminum atoms. Therefore, the original aluminum column 7 will grow upwards approximately 2.5×50A=125A. (50 A is proposed as the original depth of the aluminum column, because aluminum oxidizes to that depth and then saturates, so 125 A is seen as the maximum possible growing up of Al). The next stage, shown in FIG. 4*d*, is to bring the upper electrode back so that it touches the $Al_2O_3$ and that will limit spacing between electrodes. Alternatively, as in FIG. 2*e*, the electrodes can be positioned at the correct distance for thermotunneling immediately after separation and the aluminum spacer can be grown to meet the second electrode, without the need for subsequent electrode positioning. $Al_2O_3$ is a good insulator, having low thermal and electrical conductivity. In the event that the area of the aluminum is substantially small relative to the electrode area, the thermal and electrical conductivity introduced by the aluminum will be negligible. This method allows one to control the spacing between electrodes because one can regulate the depth of the aluminum oxide by regulating the time that oxygen is applied and the temperature. For example, if one makes the aluminum oxidize up to a depth of 20 A, the result will be an approximately 50 A lift up. Since aluminum oxidizes much faster than silicon (at least a hundred times faster), there should be no problem of silicon oxidization during the time the aluminum takes to oxidize. Further aluminum islands could be grown also on the peripheries of the electrodes if a mask with more holes is applied. In the present example, instead of a mask to selectively deposit the aluminum, a shaping material could be selectively deposited (through a mask, for example) onto a first substrate. The Al could then be added to fill gaps therein, and subsequently be grown. The shaping material could be subsequently removed, or it could even be made of suitable material to form the lower electrode. One benefit of the shaping material remaining in place is that growth of oxidized aluminum is forced to be upwards (at least for the part of the aluminum which remains below the level of the shaping material), which allows greater precision of electrode spacing, than if the aluminum could have oxidized sideways. The present embodiment allows the opposite surfaces of electrodes to remain matching one another, vis-a-vis their position, and even their surface structure, which are important considerations. This is because they originally comprised one sandwich. Methods to separate the electrodes and subsequently to draw them nearer can involve mechanical screws or piezo techniques, as well as other techniques known in the art. The present embodiment is not limited to the materials described, which were provided solely for ease of understanding. For example, $Al_2O_3$ was described as having been grown in situ, however, it could be replaced with other materials that can be grown in situ. Furthermore, the present embodiment using matching electrodes can be used in conjunction with other methods described explicitly or by reference in the present application, for example the matching, separated electrodes can be spaced apart by adding a nano-material, or using a dried out liquid, etc. Such matching electrode faces can be used with a great variety of intermediate layers used to form the spacer.

EXAMPLE 1

Explicit details of how to make a sample device are as follows. This example is given for purely illustrative reasons and should not be considered as limiting the scope of the invention in any way. A polished metal plate is covered by a thin (about 100–1000A) film of gold, or other metal that does not grow a native oxide layer. Onto this film, a layer of aluminum oxide or other insulator of approximately 50A thickness is deposited in an array. After this an appropriate fluid substance (which does not react with the metal film), is added, to fill the depressions between the insulator array, and hardened. After freezing, a second thin gold film as described above is deposited, upon which a thicker film of a cheaper metal, such as Al, Fe, Ni, etc is deposited, for mechanical solidity. The liquid is then pumped out (or otherwise released) and the process can be repeated again and again. Each intermediate conducting layer comprises a triple layer of gold-cheap metal-gold. The last metal film must be relatively thick, as it is to form the final electrode, and to it, a thicker metal plate must be attached (by soldering, for example). This plate, as the base one, prevents defects due to atmosphere pressure, and they serve as the main electrodes, having current leads attached to them. Besides for this, both upper and lower plates may encapsulate the device using an insulator hermetic (glue or other special compound etc.) around the perimeter. Of course, a cross section of this insulator should be minimal and total length maximum in order to decrease the heat losses due to thermal conductivity. The advantages of such a device are numerous. First of all the temperature difference between electrodes is divided by the number of layers (~100). Thus for each layer the delta-T is small—a very few degrees. So, the longitudinal size difference between metal layers due to different thermal expansion of layers will be very small—less than the distance between each adjacent electrode element. Such a low size differences can be compensated by relatively small mechanical tensions in metal layers, and the assembly in total will behave as a monolithic sample. Such a device will be insensitive to temperature gradients. Also, as a monolithic device, having an insulator blocking between metal layers, the device will be practically insensitive to sounds, vibrations and poundings. Also, the device is not complicated, as can be seen. It is a chip indeed: a rectangular metal plate ~1 by 1 cm and ~1–2 mm thick with a thin insulator rim and with electrical leads at each side, which does not need any preparation for working, nor any special requirements for storage. An additional advantage is that metals, which do not grow a native oxide, such as gold, will provide greater efficiency, since oxides allow for greater undesirable heat carrying by residual air or inert gas circulation. This advantage is specifically so at maximum pressures.

Whilst the present embodiment has been described with 100 or so layers, it is envisioned that it will be possible to build a useful device using 10 or even fewer layers, or even just two layers, using appropriate materials and sizing of the electrodes, intermediate elements and spacers. The present example allows for the electrodes to not have to be separated and then carefully positioned, respective to one another, since the respective layers can simply be laid upon the spacer material, which provides for appropriate spacing between layers.

The present invention has been described with regard to four basic embodiments. Each embodiment brings out new facets of the invention, but many details are interchangeable. Furthermore, many details have been specifically given, for ease of understanding, which are not to be considered limiting to the present invention. A few examples of such follow:

Each electrode is not necessarily composed of only a single layer. For example, electrodes could be composed of a thin layer of silver upon which Cu is subsequently grown. Logistics of which conductors and which insulators will be used will depend on the needs of the particular device.

Another way to form the solution mentioned above is to use globular polymer molecules suspended in solution. These have very low thermal and electrical conductivity.

One particular material that is suggested as particularly suitable is silicon macromolecules (polysiloxanes), because some of these are stable up to 800K and even higher.

Another way to apply the present invention is to grow the insulator layer directly onto the electrode surface. The electrode surface would first be covered entirely by a protective layer, which is removed in places by etching, or ion or electron beam, etc. Then an insulator may be grown in the exposed places.

The various embodiments can be made with a large variety of materials. In many cases it may be desired to obtain a low work function (WF). Such obtaining may be achieved in a variety of ways, the below descriptions should be considered exemplary only.

Alkali or alkali earth vapor at low pressure (with and without oxygen) may be added to a device as described above before it is sealed. Alternatively, materials from the lanthanum group elements and their compounds, especially their oxides. Yttrium and scandium oxides have relatively low WF. Another possibility is cesium, especially when used in conjunction with gold, platinum, etc., when they produce an intermetallic compounds with a low (~1.4–1.5 eV and less) WF, or when the electrodes are treated by oxygen before or after Cs introduce. The minimum known WF value ~1 eV is observed namely for the CsO compounds. A practical way to implement this includes using a device having electrodes coated with gold or another appropriate material, evacuating and filling the device with cesium vapor at low pressure for some time, and then sealing it.

Thus, it is apparent that there has been provided, in accordance with the present invention, a method and apparatus for a thermotunneling converter that satisfies the advantages set forth above. The thermotunneling converter may be used to convert heat to electrical power, and vice versa and may be used in a great variety of applications. Furthermore, the device may even be used in cooling applications, in which an external electrical potential is applied to cause heat to flow from the cold side of the converter to the hot side.

While this invention has been described with reference to numerous embodiments, it is to be understood that this description is not intended to be construed in a limiting sense. Various modifications and combinations of the illustrative embodiments will be apparent to persons skilled in the art upon reference to this description. It is to be further understood, therefore, that numerous changes in the details of the embodiments of the present invention and additional embodiments of the present invention will be apparent to, and may be made by, persons of ordinary skill in the art having reference to this description. It is contemplated that all such changes and additional embodiments are within the spirit and true scope of the invention as claimed below.

What is claimed is:

1. A thermotunneling converter comprising a) a plurality of electrodes having surfaces substantially facing one another;

b) a respective spacer or plurality of spacers disposed between and in contact with said electrodes to form gaps between said electrodes, where said gaps are sufficiently small to permit tunneling of electrons between said electrodes, and where the surface area of the spacer or plurality of spacers in contact with said surfaces is less than the surface area of the said surfaces;

wherein the protrusions of said surfaces substantially facing one another that do not have a spacer between them are characterized in that: indentations on the inner surface of either electrode face protrusions in the facing surface of the other electrode.

2. The thermotunneling converter of claim 1 wherein the surface area of the spacer or plurality of spacers is approximately a quarter of the surface area of the electrodes.

3. The thermotunneling converter of claim 1 wherein said spacer or spacers comprise material that is a thermal insulator.

4. The thermotunneling converter of claim 1 wherein said spacer or spacers comprise material that is an electrical insulator.

5. The thermotunneling converter of claim 1 wherein the gaps are evacuated.

6. The thermotunneling converter of claim 1 wherein the gaps are filled with an inert gas.

7. The thermotunneling converter of claim 1 wherein said spacer or plurality of spacers comprises a plurality of nanotubes, nanowires or buckyballs.

8. The thermotunneling converter of claim 7 wherein one of the electrodes is a thin sheet of metal having surface indentations of appropriate sizing of maintaining the portions of said nanotubes, nanowires or buckyballs.

9. The thermotunneling converter of claim 1 wherein said spacer or plurality of spacers comprises an oxide.

10. The thermotunneling converter of claim 1 wherein said spacer or plurality of spacers comprise $Al_2O_3$.

11. The thermotunneling converter of claim 1 wherein one or more of said plurality of electrodes comprises a silicon substrate.

12. The thermotunneling converter of claim 1 wherein one or more of said plurality of electrodes comprises a thin layer of silver and a thicker layer of copper.

13. The thermotunneling converter of claim 1 wherein said spacer or plurality of spacers have the form selected from the group consisting of: hexagonal arrays, strips, circles, rings, lattices, pillars, and bottom heavy pillars.

14. The thermotunneling converter of claim 1 wherein said plurality of electrodes is 100 or fewer.

15. The thermotunneling converter of claim 1 wherein said plurality of electrodes is 10 or fewer.

16. The thermotunneling converter of claim 1 wherein said plurality of electrodes is 2.

17. A method for making thermotunneling converter comprising a plurality of electrodes having surfaces substantially facing one another and a respective spacer or plurality of spacers disposed between and in contact with said electrodes to form gaps between said electrodes, where said gaps are substantially small to permit tunneling of electrons between said electrodes, and where the surface area of the spacer or plurality of spacers in contact with said surface is less than the surface area of the said surfaces comprising a) providing a first electrode;

b) applying a spacer material to selected areas of the first electrode;

c) filling the non-selected areas with removable matter;

d) depositing upon the spacer material and the removable matter, a second electrode;

e) removing the removable matter;

f) applying a spacer material or selected areas of a second electrode;

g) filling the non-selected areas with removable matter;

h) depositing upon the spacer material and the removable matter, a third electrode;

i) repeating steps f), g) and h) with reference to subsequent electrodes, as many times as desired.

18. The method of claim 17, wherein said step of applying a spacer material to selected areas thereof comprises applying said spacer material to less than half of the surface of the first electrode.

19. The method claim 17 wherein said step of applying a spacer material to selected areas thereof comprising depositing spacer material in the form selected from the group consisting of: islands, strips, hexagons, an X, pillars, circles, rings and lattices.

20. The method claim 17 wherein said step of applying a spacer material comprises the steps of: depositing growable spacer material upon the first electrode and applying an appropriate medium for the growth of the spacer material in situ.

21. The method claim 17 wherein the removable matter comprises soluble matter, and wherein said step of removing the removable matter comprises: introducing a solvent to dissolve the soluble matter, and releasing the solute from between the electrodes.

22. The method claim 21 wherein the step of releasing the solute is selected from the group consisting of: draining away the solute, pumping away the solute, evaporating away the solute, and draining the solute from between the electrodes whilst leaving it within a housing surrounding the electrodes.

23. The method claim 17 wherein the removable matter comprises evaporable matter and wherein said step of removing the removable matter comprises the step of evaporating the evaporable matter.

24. The method of claim 17 wherein said step e) of removing the removable matter being done only after step i) of repeating steps f), g) and h) as many times as desired.

25. The method claim 17 wherein the step of filling the non-selected areas with removable matter is done by applying the removable matter with constant depth whereby the structure of the surface of the first electrode will be replicated in the surface of the removable matter, and the inverse of said structure will be replicated in the contacting surface of the second electrode at least in the regions not separated by spacer material.

26. The method claim 17 further comprising the step of evacuating the regions unoccupied by spacer material, after the removal of the removable matter therefrom.

27. The method claim 17 further comprising the step of filling the regions unoccupied by spacer material with an inert gas subsequent to the removal of the removable matter therefrom.

28. The method claim 17 wherein the first electrode comprises gold, and further including the step of filling the regions unoccupied by spacer material with cesium.

29. The method claim 17 wherein the step of filling the non-selected areas with removable matter is done by applying the removable matter with constant depth whereby the structure of the surface of the first electrode will be replicated in the surface of the removable matter filling, and the inverse of said structure will be replicated in the contacting surface of the second electrode at least in the regions not separated by spacer material.

30. The method claim 17 wherein said step c) of filling the non-selected areas with removable matter, is done before step b) of applying a spacer material to selected areas of the first electrode.

31. The method claim 30 wherein step c) is done by a method selected from the group consisting of: application through a mask of removable material to non-selected areas and subsequent growth of removable material, selective deposition of removable material, selective deposition and subsequent growth of the removable material, and protectively coating the first electrode surface and then beaming away a section or sections of the protective coating and growing the removable material in the beamed away section or sections.

32. The method claim 17 wherein said step d) of depositing upon the spacer material and the removable matter, a second electrode, comprises laying a thin film upon the spacer material and removable matter.

33. The method claim 17 wherein said step of repeating steps f), g) and h) is performed less than 100 times.

34. The method claim 17 wherein said step of repeating steps f), g) and h) is performed less than 10 times.

35. The method claim 17 wherein said step of repeating steps f), g) and h) is omitted from said method.

36. A method of making a thermoelectric converter of claim 1 comprising the steps of:

a) preparing a first electrode;

b) depositing a plurality of articles having a small cross-sectional area upon the first electrode;

c) laying a second electrode onto the plurality of articles;

d) depositing a further plurality of articles having a small cross-sectional area upon the second electrode;

e) laying a third electrode onto the plurality of articles deposited in step d); and f) repeating steps d) and e) until the desired number of layers has been achieved.

37. The method of claim 36 further comprising the step of positioning the plurality of small articles in a desired manner upon said first electrode.

38. The method of claim 37 wherein said step of positioning said small articles comprises using electromagnetic forces to position them.

39. The method of claim 36 further comprising the step of shaping one or both of the electrodes to hold the plurality of articles in position.

40. The method of claim 36 wherein said plurality of articles comprise nanotubes, nanowires or buckyballs and further comprising the step of using electromagnetic forces to position the articles into desired positions.

41. The method of claim 36 wherein said plurality of articles have low thermal conductivity.

42. The method of claim 36 wherein said plurality of articles have low electrical conductivity and further including the step of connecting the electrodes to a circuit.

43. The method claim 36 wherein said step of repeating steps d) and e) is performed less than 100 times.

44. The method claim 36 wherein said step of repeating steps d) and e) is performed less than 10 times.

45. The method claim 36 wherein said step of repeating steps d) and e) is omitted from said method.

46. A method for making the thermotunneling converter comprising a plurality of electrodes having surfaces substantially facing one another and a respective spacer or plurality of spacers disposed between and in contact with said electrodes to form gaps between said electrodes, where said gaps are sufficiently small to permit tunneling of electrons between said electrodes, and where the surface area of the spacer or plurality of spacers in contact with said surfaces is less than the surface area of the said surfaces comprising a) preparing a first electrode;

b) depositing a substance to selected areas thereupon, wherein the substance is of the type that will grow to a greater height when exposed to a medium;

c) adding a second electrode;

d) positioning the second electrode at a distance from the first electrode to allow for the growth of the substance;

e) providing the medium for growth of the substance;

f) repositioning as necessary the second electrode relative to the first electrode.

47. The method of claim 46 wherein the substance is $Al_2O_3$ and wherein said step of providing a medium for the growth of the substance comprising introducing oxygen to the area surrounding the substance.

48. The method of claim 47 wherein said step of introducing oxygen is precisely done to control the amount of growth of the substance.

49. The method of claim 46 wherein the surfaces of the electrodes that contact the substance do not oxidize substantially fast whilst the substance is made of a material that oxidizes substantially fast, and wherein said step of providing a medium for growth of the substance comprising the step of oxidizing the substance.

50. The method of claim 46 wherein the surfaces of the first electrode is made of silicon and the substance is aluminum, and wherein said step of providing a medium for growth of the substance comprising the step of oxidizing the aluminum.

51. The method of claim 50 wherein the step of oxidizing the aluminum is done with regard to the desired amount of growth of the aluminum.

52. The method of claim 46 wherein the step of adding a second electrode is done by depositing the second electrode onto the layers of first electrode and the substance, and subsequently separating the second electrode from the first electrode.

* * * * *